(12) United States Patent
Louis

(10) Patent No.: US 7,365,774 B2
(45) Date of Patent: Apr. 29, 2008

(54) DEVICE WITH CAMERA MODULES AND FLYING APPARATUS PROVIDED WITH SUCH A DEVICE

(76) Inventor: Pierre Louis, rue du Chauffour 4, B-5032, Isnes-les-Dames (Gembloux) (BE)

( * ) Notice: Subject to any disclaimer, the term of this patent is extended or adjusted under 35 U.S.C. 154(b) by 773 days.

(21) Appl. No.: 10/318,894

(22) Filed: Dec. 13, 2002

(65) Prior Publication Data
US 2004/0114038 A1  Jun. 17, 2004

(51) Int. Cl.
*H04N 5/225*  (2006.01)
(52) U.S. Cl. .................................................. 348/219.1
(58) Field of Classification Search ............. 348/218.1, 348/219.1, 117, 123, 144
See application file for complete search history.

(56) References Cited

U.S. PATENT DOCUMENTS

| | | | |
|---|---|---|---|
| 3,744,387 A | 7/1973 | Fuller | |
| 3,902,084 A | 8/1975 | May, Jr. | |
| 5,668,595 A * | 9/1997 | Katayama et al. | 348/218.1 |
| 5,897,223 A | 4/1999 | Tritchew | |
| 5,949,477 A * | 9/1999 | Hoglin | 348/47 |
| 6,831,688 B2 * | 12/2004 | Lareau et al. | 348/272 |
| 2003/0138247 A1 * | 7/2003 | Trunz et al. | 396/325 |

FOREIGN PATENT DOCUMENTS

| | | |
|---|---|---|
| DE | 1950245 | 12/1995 |
| DE | 100 34 601 | 1/2002 |
| EP | 1 178 283 | 2/2002 |
| FR | 2 729 479 | 11/1996 |

OTHER PUBLICATIONS

Internationnal Search Report for PCT/BE 03/00218; Authorizing Officer: Boeykens, J.; Dated May 3, 2004.
An advertisement for the product UltraCam-D. Applicant is advised that this product was first marketed in 2004 according to Photographic Week 2005, Table 1.
An Abstract from the Journal of Electronic Imaging dated Oct. 2004 concerning time delay and integration (TDI).
An article from the internet, entitled "Image Quality; Digital Pansharpening versus Full Color Film," by Roland Perko et al. some time after Sep. 2004 based on the table appearing on p. 3 of the article.
An article from the journal Photogrammetric Week 2005 entitled "Ultracam-D: Understanding Some Noteworthy Capabilities" by Leberi and Gruber.
Promotional publication entitled "Dimac Digital Modular Aerial Camera" showing the results obtained by the present invention, published no earlier than 2005.

* cited by examiner

*Primary Examiner*—Tuan Ho
(74) *Attorney, Agent, or Firm*—Hovey Williams LLP

(57) ABSTRACT

A device for positioning camera modules includes a frame, at least two camera modules, and an orientor adapted for orienting the central optical axis of each camera module with respect to the frame. The orientor is adapted for orienting at least the central optical axes of the camera modules so as to ensure overlapping fields of view, whereby the orientor is detachably mounted with respect to the frame, while the camera modules are detachably mounted with respect to the orientor.

55 Claims, 8 Drawing Sheets

DEVICE WITH CAMERA MODULES AND FLYING APPARATUS PROVIDED WITH SUCH A DEVICE

FIELD OF THE INVENTION

The invention relates to a device for positioning camera modules, so that a correct overlapping of images taken by the camera modules is ensured, while ensuring also a good definition of the images.

THE PRIOR ART

Flying apparatus provided aerial cameras, such as digital mapping camera DMC, are known.

The DMC employs CCD frame or matrix sensors. In a commercial products old by ZI Imaging (A US company), the digital mapping camera comprises eight individual cameral modules. The data collected from the sensors are transferred to an image data processing unit ensuring a forward motion compensation. The DMC is suitable for taking pictures or images at a specific height, function of the objectives and lenses used for the camera modules.

Although the DMC is quite expensive, the DMC is thus not suitable for taking images of the ground at 1000 m (view for having level information ) and then at 4000 m (view for mapping information), i.e. the DMC cannot be modified in function of the requested need.

The present invention has for subject matter a device suitable for orienting the different independent camera modules, so as to enable to use the same camera modules after change of the objectives or lenses for taking images at a high of 1000 m at one moment and at another moment at a different height. The adaptation of the digital mapping camera is easy and can be made during the flight.

DESCRIPTION OF THE INVENTION

The invention relates to a device for cameras for taking images of an object or surface, said device being adapted to be mounted on stabilized suspension system to be mounted on an movable vehicle moving at a relative speed higher than 100 km/hour (such as relative speed of more than 200 km/hour, more than 300 km/hour, such as 350 km/hour, 400 km/hour, 500 km/hour or even more, such a vehicle being advantageously a flying apparatus, especially an airplane) with respect to the object or surface to be taken in images The device comprises:

a frame,
at least two camera modules (such as two, three, four, six, eight, ten, etc, four being preferred) for taking a first series of views by the first camera module and a second series of views by the second camera module, each camera module comprising a first portion comprising at least a framing sensor and a second portion comprising at least a viewing element selected in the group consisting of objectives, lenses, and combinations thereof, whereby the viewing element has a central optical axis, said framing sensor being provided with means for transferring data collected by the sensor to an element selected from the group consisting of data memory, data treatment system and combinations thereof, and
a means adapted for orienting the central optical axis of the viewing element of each camera module with respect to the frame,
in which the means for orienting the central optical axis of the viewing element of each camera module is adapted for orienting at least the central optical axis of a first camera module and the central optical axis of a second camera module, whereby said orienting means is mounted detachable with respect to the frame, while at least the first portion of each camera module is mounted detachable with respect to said orienting means.

By using such a device, it is possible to remove the camera modules (or at least the first portion thereof) from the means for orienting the central optical axis of the camera modules and to use another means for orienting the central optical axis of the camera modules, so as adapt easily the working of the camera modules, for example due to the height of the air plane.

Advantageously, the device comprises at least one means for positioning the means for orienting the central optical axes of the camera modules with respect to the frame. Such a positioning means is advantageously adapted for limiting the possible movement of the means for orienting the camera modules with respect to the frame. The possible movement of said orienting means with respect to the frame is for example less than 1 cm, advantageously less than 0.5 cm, preferably less than 0.25 mm.

Advantageously, the means for orienting the central optical axes of the camera modules is a rigid support provided with at least two passages, each passage being associated to at least one seat element adapted for contacting at least a portion of a camera module.

Preferably, the rigid support is provided with an arm on which an inertial module is attached.

According to an embodiment, the orienting means is a support provided with at least two passages, each passage being associated to at least one seat element adapted for contacting a portion of a camera module, whereby a first seat is adapted for directing the central optical axis of a first camera module in a first direction, while a second seat is adapted for directing the central optical axis of a second camera module in a second direction, whereby the first and second directions are adapted for ensuring an overlapping of a view taken by the first camera module and a view taken by the second camera module.

According to a detail of an embodiment, the viewing element associated to a camera module is mounted on said camera module in a detachable way, while at least one attachment means is adapted for maintaining the viewing element in position with respect to the camera module.

According to a specific embodiment, the second portion comprising the viewing element is attached to the means for orienting the central optical axes of the camera modules. The means for orienting the camera modules can form a single piece suitable for taking pictures at a specific height and with a specific overlapping of the pictures or images with said camera modules. The replacement of one specific piece by another specific piece enables the use of the same first portion of the camera modules for taking pictures at different height or with different overlapping.

Preferably, each camera module is associated to a forward motion compensation means. Most preferably, the forward compensation means is acting on the framing sensor so as to compensate the relative speed of the air plane with respect to the surface to be photographed.

According to a specific embodiment, in which the camera module is adapted for taking a view in an exposure time of less than 0.1 second, and in which the framing sensor of a camera is mounted movable with respect to the viewing element of the camera module considered, the framing sensor is associated to a control means so as to ensure at least a movement of the sensor at a substantially constant speed for a period of time greater than the exposure time, advantageously for a period of time greater than twice the exposure time, preferably for a period of time greater than 5 times the exposure time, for example during a period comprised between 5 and 100 times the exposure time. The exposure time is advantageously lower than 0.01 second, such as 0.005 second, 0.003 second, 0.002 second, 0.001 second, or even less.

For example, the framing sensor of each camera module is mounted movable with respect to the viewing element, and a control means controls the movement of the framing sensor, whereby said control means comprises at least one element selected from the group consisting of guiding rails, motors, piezo flexure positioners, and combinations thereof. A preferred element is a piezo flexure positioners, possibly combined with guiding rails. Advantageously, the framing sensor with its electronic processing unit is moved, preferably with a piezo flexure positioner.

Advantageously, the means for orienting the central optical axis of the camera modules is connected to the frame with interposition of a vibration absorbing means.

According to a specific embodiment, the orienting means is a support provided with at least four passages, each passage being associated to at least one seat element adapted for contacting at least a portion of a camera module, whereby a first seat is adapted for directing the central optical axis of a first camera module in a first direction, a second seat is adapted for directing the central optical axis of a second camera module in a second direction, a third seat is adapted for directing the central optical axis of a third camera module in a third direction and a fourth seat is adapted for directing the central optical axis of a fourth camera module, whereby the first and second directions are adapted for ensuring an overlapping of a view taken by the first camera module and a view taken by the second camera module, while the third and fourth directions are adapted for ensuring an overlapping of a view taken by the third camera module and a view taken by the fourth camera module.

For example, the camera module is selected from the group consisting of IR camera modules, multi spectral camera modules, uni/mono colour camera modules, panchromatic or panchromatic camera modules, and combinations thereof.

According to a specific embodiment, the frame is a receptacle provided with at least two openings, a first opening being adapted for placing the means for directing the central optical axes of the camera modules at least partly in the receptacle, while the second opening is adapted for ensuring the taking of images by the camera modules or a field of view for each camera module. The receptacle is provided with means for supporting the means for directing the central optical axes of the camera modules with interposition of a vibration absorption means.

Preferably, the receptacle is provided with one or more bottom elements with a transparent and anti diffraction sheet, said bottom elements forming with the receptacle and a cover thereof a substantially closed chamber in which the camera modules are located. The device comprises then advantageously a heating element for ensuring a substantially constant temperature in the receptacle.

Advantageously, the receptacle is provided with means for connecting the receptacle to a stabilized suspension.

The device of the invention comprises advantageously a stabilized suspension connected to the frame.

The invention relates also to a camera module portion comprising a framing sensor and a means for connecting said portion to another camera module portion comprising at least a viewing element selected in the group consisting of objectives, lenses, optical glasses and combinations thereof, whereby each viewing element has a central optical axis, said framing sensor being provided with means for transferring data collected by the sensor to an element selected from the group consisting of data memory, data treatment system and combinations thereof, whereby the camera module portion with the viewing element is adapted for taking a view in a exposure time of less than 0.1 second, in which the framing sensor of the camera module portion is mounted movable with respect to the viewing element of the camera module, and in which the framing sensor is associated to a control means so as to ensure at least a movement of the sensor at a substantially constant speed during a period of time greater than the exposure time.

Advantageously, the framing sensor is associated to a control means so as to ensure at least a movement of the sensor at a substantially constant speed for a period of time greater than twice the exposure time, preferably for a period of time greater than 5 times the exposure time, such as for a period comprised between 5 and 100 times the exposure time.

The control means comprises advantageously at least one element selected from the group consisting of guiding rails, motors, piezo flexure positioners, and combinations thereof, preferably at least a piezo flexure positioner.

According to a specific embodiment, the camera module comprises a supporting piece bearing the framing sensor, as well as electronic control means for said framing sensor, said supporting piece having a first edge and a second edge opposite to the first edge. The module comprises two piezo flexure positioners having each a moving part, the moving part of a first piezo flexure positioner being attached to the first edge of the supporting piece, while the moving part of the second piezo flexure positioner is attached to the second edge of the supporting piece.

The camera module is advantageously selected from the group consisting of IR camera module, multi spectral camera module, uni/mono colour camera module, chromatic or panchromatic camera module, and combinations thereof.

The camera module of the invention can be used alone or in combination with one or more camera modules (of the invention or not of the invention, but preferably in accordance to the invention) in a camera, such as in an aerial camera. The invention relates also to a camera provided with at least one camera module of the invention.

The invention further relates to a flying apparatus provided with cameras for taking images of an object or surface, said flying apparatus comprising a stabilized suspension on which a device with distinct camera modules is mounted, said device being a device of the invention as disclosed here above or being a device comprising at least a camera module of the invention or a camera of the invention.

The invention relates also to a process for taking images by using an apparatus or a camera module of the invention. In particular, the process is a process for taking images of an object or surface during a flight of a flying apparatus provided with cameras, whereby said flying apparatus comprises a stabilised suspension on which a device with one or more camera modules (preferably several distinct camera modules) is mounted, whereby at least one camera module comprises a first portion with a framing sensor and a second portion with at least a viewing element selected in the group consisting of objectives, lenses, optical glasses and combinations thereof, whereby the camera module has a central optical axis, said framing sensor being provided with means for transferring data collected by the sensor to an element selected from the group consisting of data memory, data treatment system and combinations thereof, whereby the camera module is adapted for taking a view in a exposure time of less than 0.1 second, in which the framing sensor of the camera module is mounted movable with respect to the second portion, in said process the framing sensor is moved at a substantially constant controlled speed for a period of time greater than the exposure time so as to ensure a forward motion compensation of the images taken during the flight.

Details and characteristic of the invention will appears from the following description of preferred embodiments of the invention, in which reference is made to the attached drawings.

BRIEF DESCRIPTION OF THE DRAWINGS

In said drawings.

DESCRIPTION OF PREFERRED EMBODIMENTS

Figure 1:
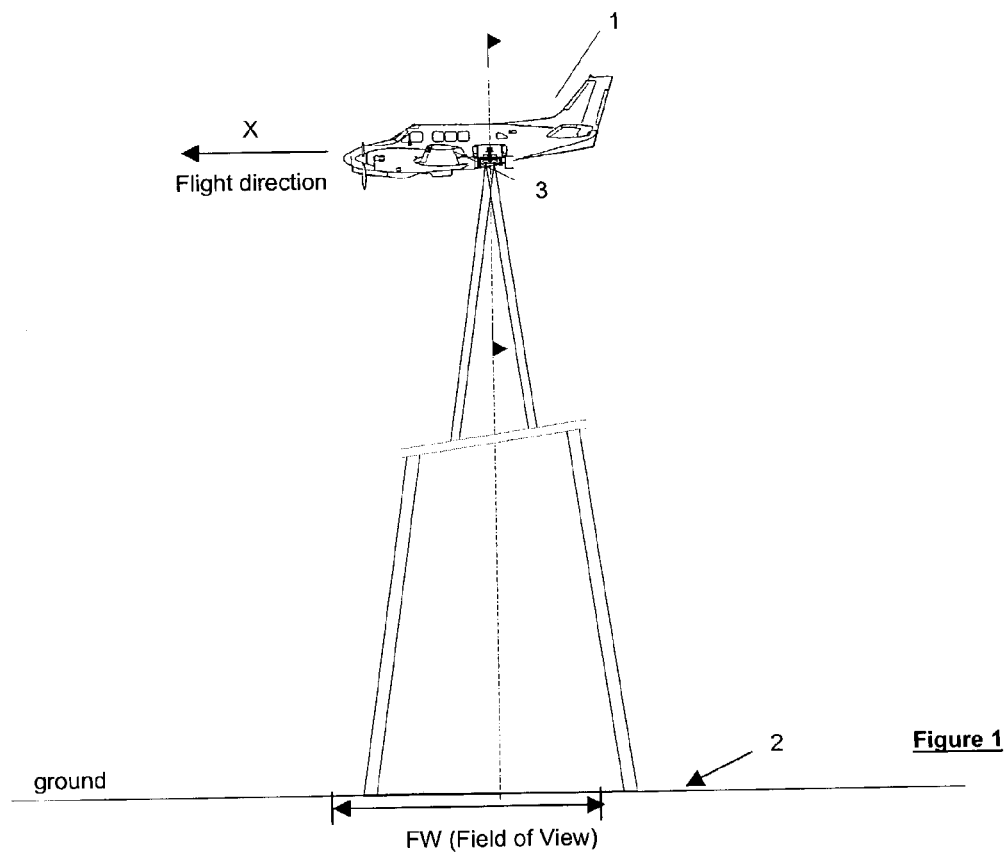
FIG. 1 is a schematic view of an air plane provided with a device of the invention.
Figure 2:
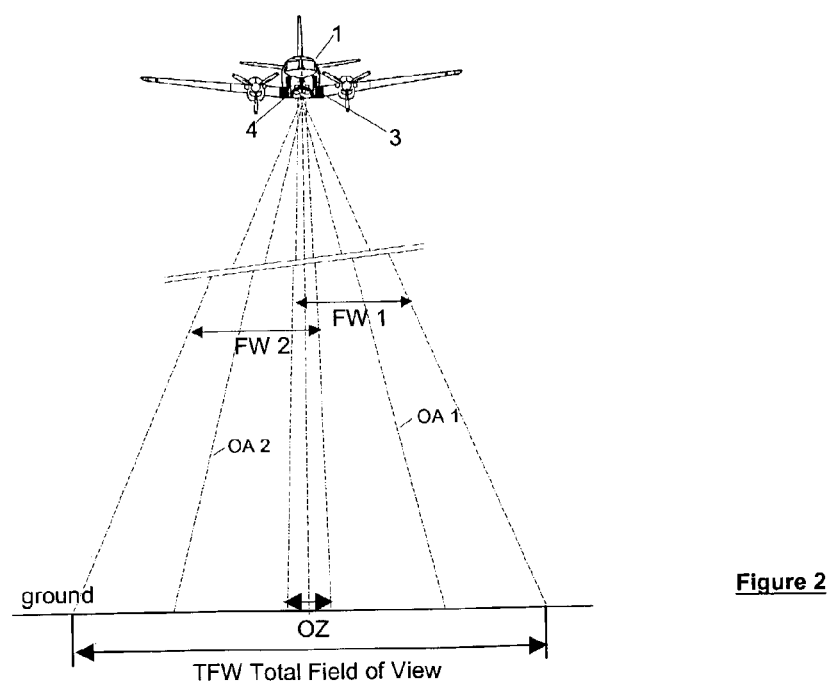
FIG. 2 is a front view of the air plane of FIG. 1.

The air plane 1 is provided with a device 3 for taking successive images of the ground 2, when flying according to a flight mission (for example in the flight direction X). The device 3 comprises a series of independent camera modules (for example four camera modules 4 for taking different images along different view axis ). Each camera module has a central optical axis OA1,OA2 and have a field of view FW1,FW2 defined by an angle W (see FIGS. 2 and 3).

Figure 3:
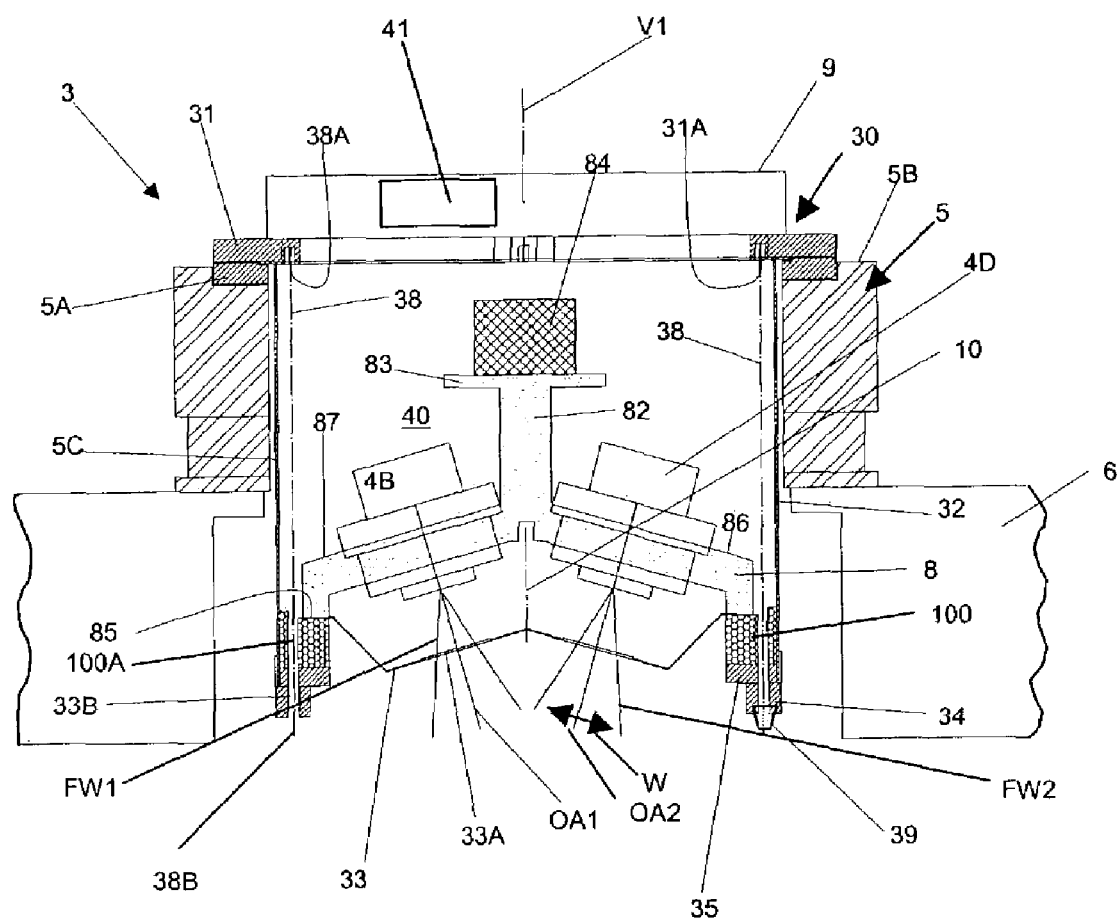
FIG. 3 is a cross section view of the device used in the air plane of FIG. 1

The device 3 represented in FIG. 3 is mounted on a stabilized suspension 5 mounted on the bottom 6 of the aircraft 1, said suspension is controlled by motors (not shown) adapted for correcting the position of the device 3 in function of the movement of the air plane, for example due to air turbulence. The suspension 5 comprises a support 5B which can rotate around two substantially horizontal axes H1,H2 and which comprises a rotating ring plate 5A able to rotate around a substantially vertical axis V1.

The suspension 5 has a central open cylindrical chamber 5C suitable for receiving the device 3.

The device 3 comprises:

a frame 30 formed by an upper ring 31 adapted for resting on the ring plate 5A, a cylindrical wall 32, a lower ring 34, an intermediate ring 35, rods 38 with screwed ends 38A,38B, whereby said rods extend between the lower ring 34 and the upper ring 31, while passing through the lower ring 34 and the intermediate ring 35. Bottom protection covers 33 provided with transparent anti diffraction sheet 33A protect the optical lens of each camera module 4B,4D. The transparent sheet 33A is adapted for the field of view of the camera module. The bottom cover 33 has an edge 33B resting on the anti vibration ring 100 (for example made in foam, such as substantially rigid foam, PUR foam, with closed cells or open cells). The end 38A of a rod 38 is screwed in a recess 31A of the upper ring, while a bolt 39 is screwed on the end 38B. Said frame 30 defines a receptacle with an inner cylindrical chamber 40. The anti vibration ring 100 is placed on the intermediate ring 35, said ring being provided with passages 100A for the rods 38. The transparent sheet 33A is placed so as to be perpendicular to the central optical axis of the camera module. A cover 9 covers the upper passage of the frame or receptacle 30. The inner chamber 40 is provided with a heating means 41 so as to control the temperature of said chamber and so as to ensure that the camera modules 4A,4B,4C,4D located in the chamber 40 are at a same temperature, advantageously at a substantially constant temperature.

Figure 5:
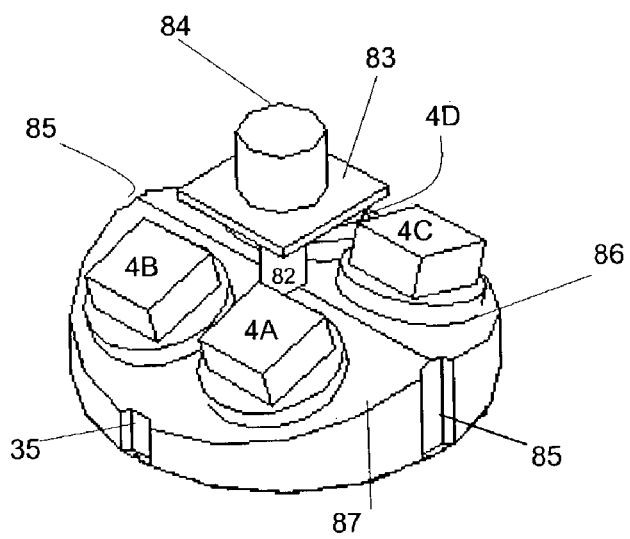
FIG. 5 is a perspective view of the detachable support bearing the independent camera modules.
Figure 6:
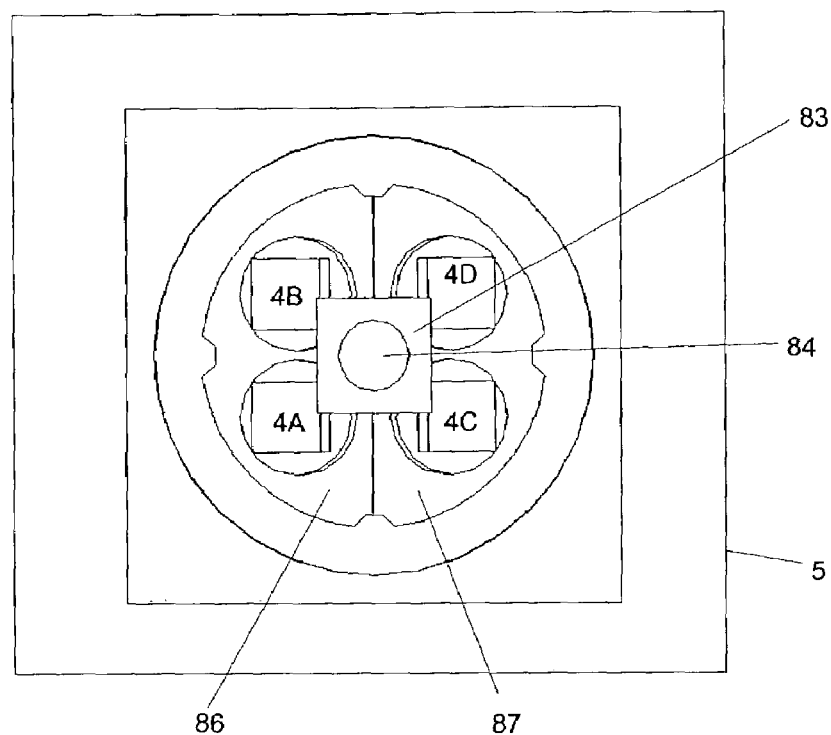
FIG. 6 is an upper view of the support of FIG. 5 placed on the suspension system with the cover removed.
Figure 7:
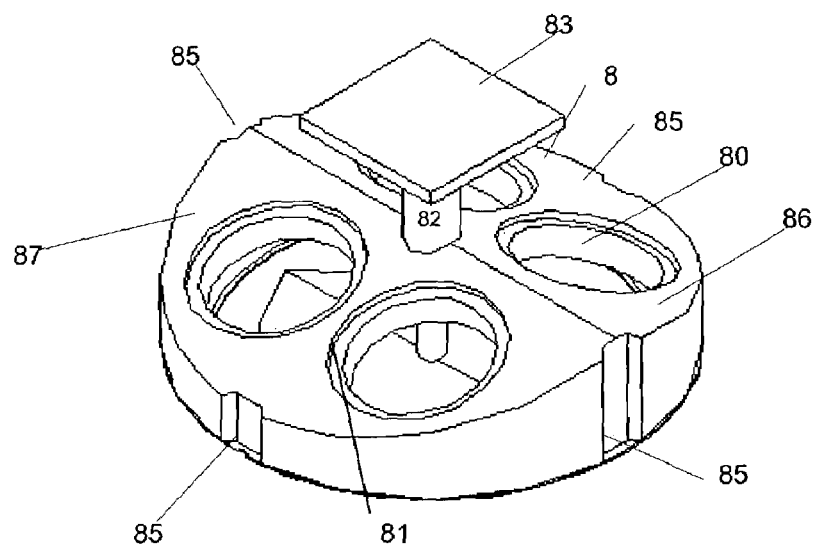
FIG. 7 is a perspective view of the detachable support of FIG. 5 after removing the camera modules.

A rigid support element 8 provided with passages 80 having seats 81 for camera modules 4 (see FIG. 7), said rigid support 8 having an arm 82 bearing a horizontal plate 83 on which is attached an inertial module 84 (see FIG. 5). The support 8 has along its edge vertical grooves 85 in which the rods 38 extend. The rods cooperate with said grooves 85 so as to limit the movement of the support element 8 with respect to the frame 30. The arm 8 is for example welded to the support element 8. The rigid support 8 has two inclined faces 86,87 so as to orient the optical axis of the camera modules 4B,4D in a first direction OA1, while orienting the camera modules 4C,4D in a second direction OA2. Due to said orientation, the field of view FW2 overlaps the field of view FW1, said overlapping zone OZ (see FIG. 2) corresponding for example to at least 10% (preferably more than 20%, such as for example from 20 to 75%, such as 25%, 40%, 50%) of the total field of view TFW. The bottom covers 33 are attached to the support 8 by a central leg 10.

The camera modules 4A,4B,4C,4D are fixed on the support 8 by screwing or by a clipping mechanism.

When flying, it is possible to remove the cover 9 so as to remove the support 8 out of the chamber 40. The camera modules can be removed from the support 8. The system enables thus the use of another support 8 with the same camera modules, for example for having a different overlapping of the fields of view or to use different lenses for the camera modules with a different support for taking images at a different height.

Each camera module comprises:

a first portion 50 with a framing sensor 51 (such as a CCD or a CMOS) mounted on a plate 52 of a flexure piezo positioner 53, said positioner 53 being controlled so as to enable a movement of less than 100 μm of the plate within a time of a few milliseconds, such as within a period of 10 to 20 milliseconds, the movement of the plate 52 being guided by rails 59, a second portion 54 provided with the lenses 55 and a shutter 56 (the working of the shutter is controlled so as to expose the framing sensor to light at a specific time and during a specific period of time (for example in function of the position of the air plane), and means 57 for attaching the first portion 50 with the second portion 54.

Figure 8:
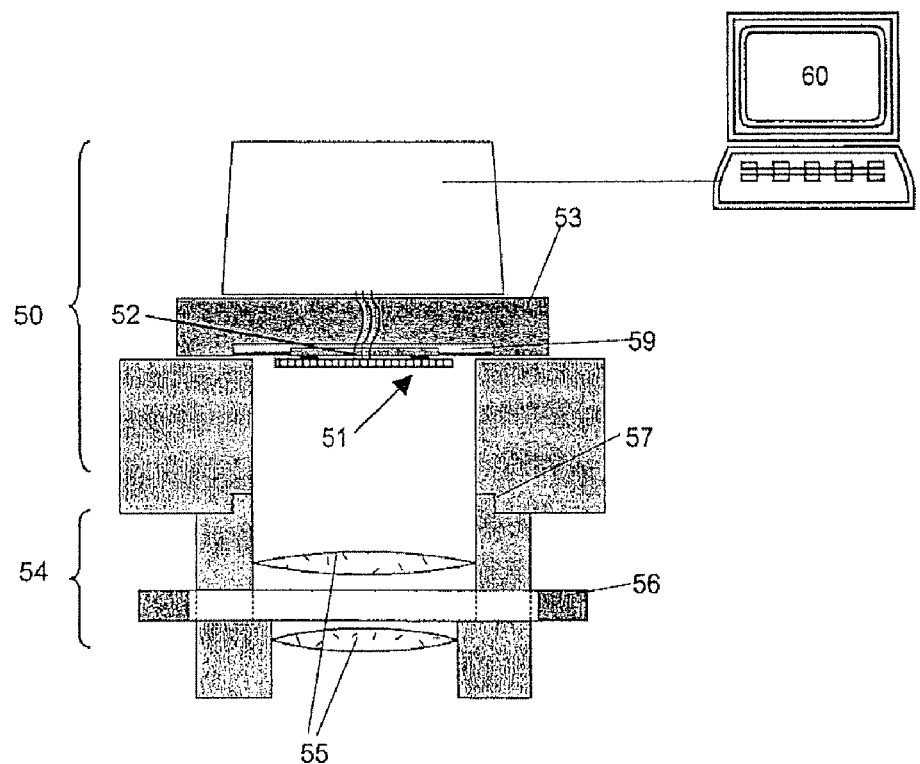
FIG. 8 is a cross section view of a camera module.

In the embodiment of figure 8, the electronic part 58 is not fixed on the plate 52, but is connected via wires 58A to the sensor 51. The movement of the plate is made parallel to the flight direction X of the air plane. The movement of said plate is controlled by a forward motion compensation system 60 receiving information from the air plane (such as speed) and comprising a piezo flexure positioner 53 so as to compensate the forward motion of the air plane with respect to the ground to be photographed during the exposure time of the sensor. The movement of the plate 52 and thus of the framing sensor 51 is parallel to the movement of the air plane (X) during the exposure time so as to compensate the movement of the air plane during the exposure time for the image taken by the framing sensor.

Figure 9:
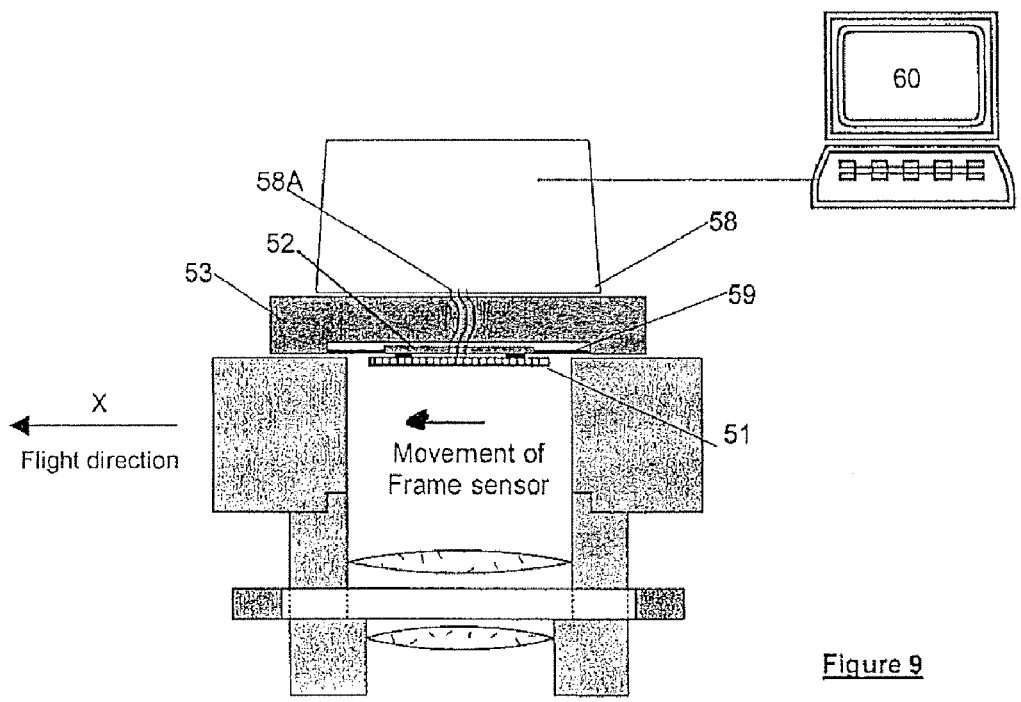
FIG. 9 is a view showing the movement of the framing sensor of the camera module of FIG. 8 during the exposure time for a flight.

FIG. 9 shows the end movement of the plate 52, before its return in the initial position.

Figure 14:
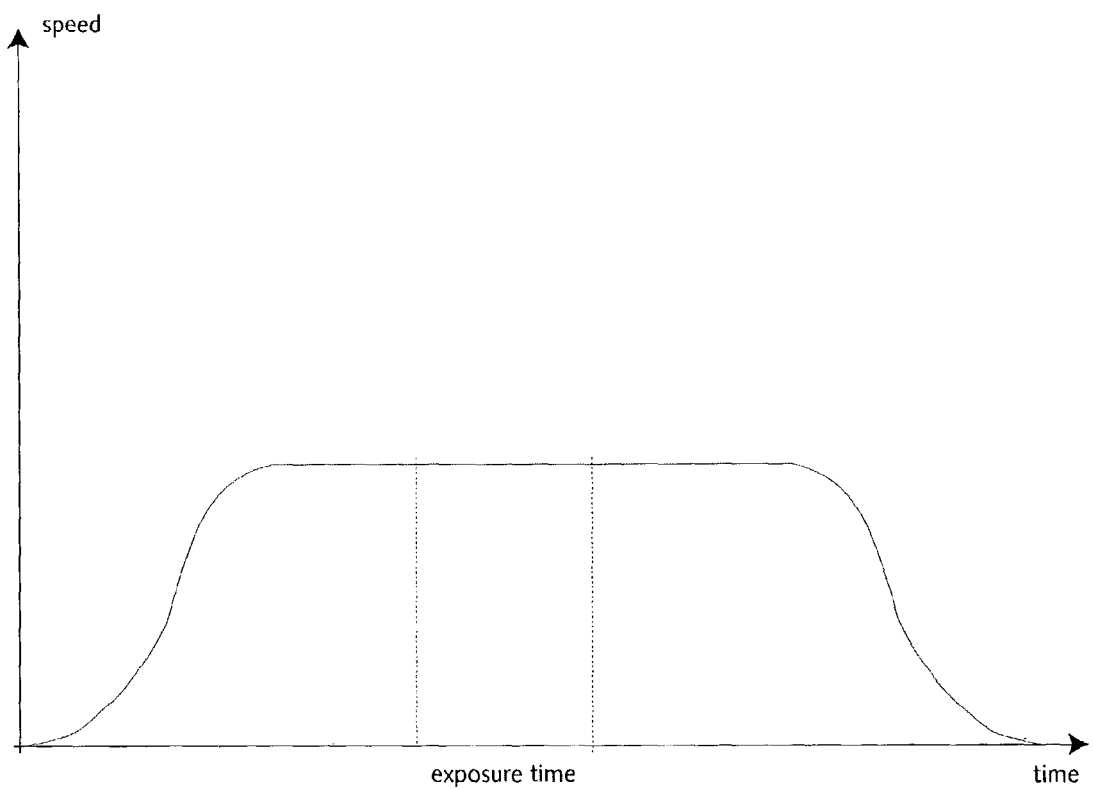
FIG. 14 represents a graph giving the speed of the plate of the piezo flexure positioner (and therefore of the framing sensor) in function of the time.

The movement speed of the plate increases first progressively to a constant speed. Said constant speed is then maintained during a time period of a few milliseconds, such as 10 milliseconds or 20 milliseconds. The variation of speed of the plate 52 is represented in FIG. 14. The shutter 56 is controlled so that the exposure time (for example 1/500 second or 1/1000 second) is made during a movement of the plate 52 (i.e. of the sensor) at a constant speed.

Figure 10:
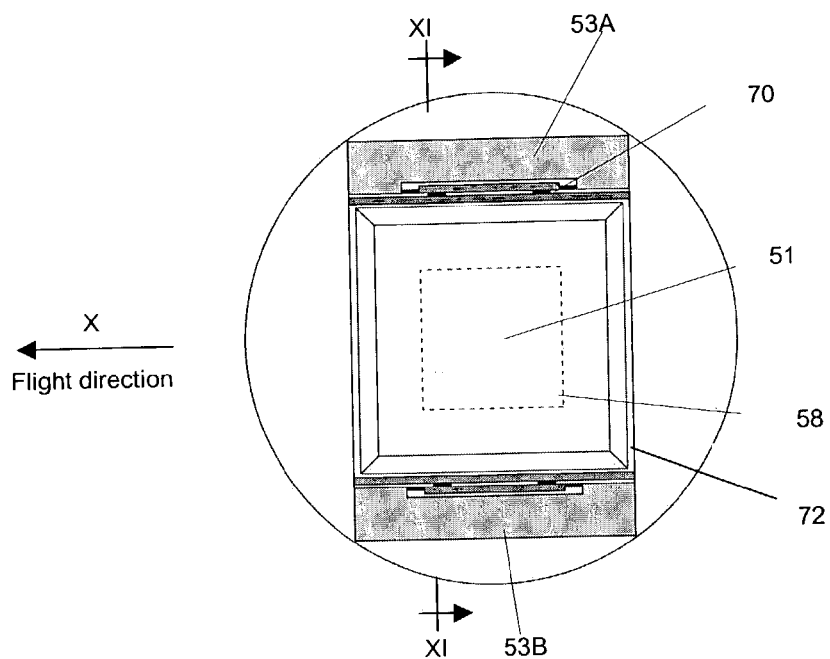
FIG. 10 is an upper view of another camera module.
Figure 11:
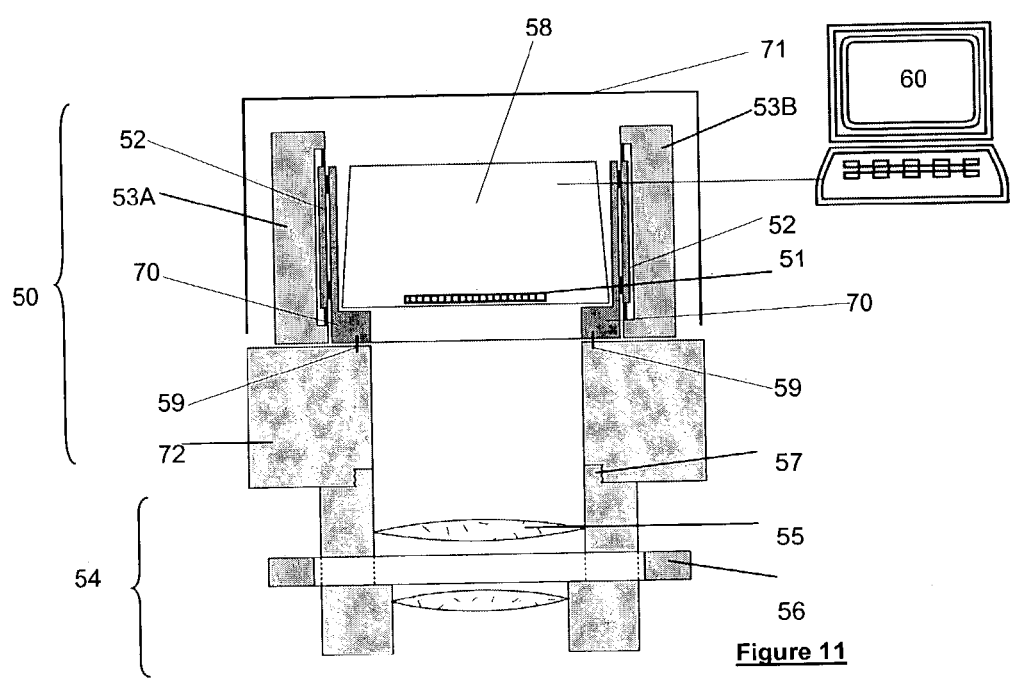
FIG. 11 is a cross section view along the line XI-XI.

FIGS. 10 and 11 show another camera module similar to the camera module of FIG. 8, except that the electronic system 58 is attached to a supporting piece 70 having two opposite edges 70A,70B. The opposites edges 70A are respectively attached to a left flexure piezo positioner 53A and to a right flexure piezo positioner 53B. The movement of the supporting piece 70 is guided by two parallel rails 59. The framing sensor 51 is directly connected to its electronic part 58. A cover 71 is attached to a rigid carrier 72 so as to form a protection for the flexure piezo positioners and the electronic part. In FIG. 10, the protective cover 71 was removed.

Figure 12:
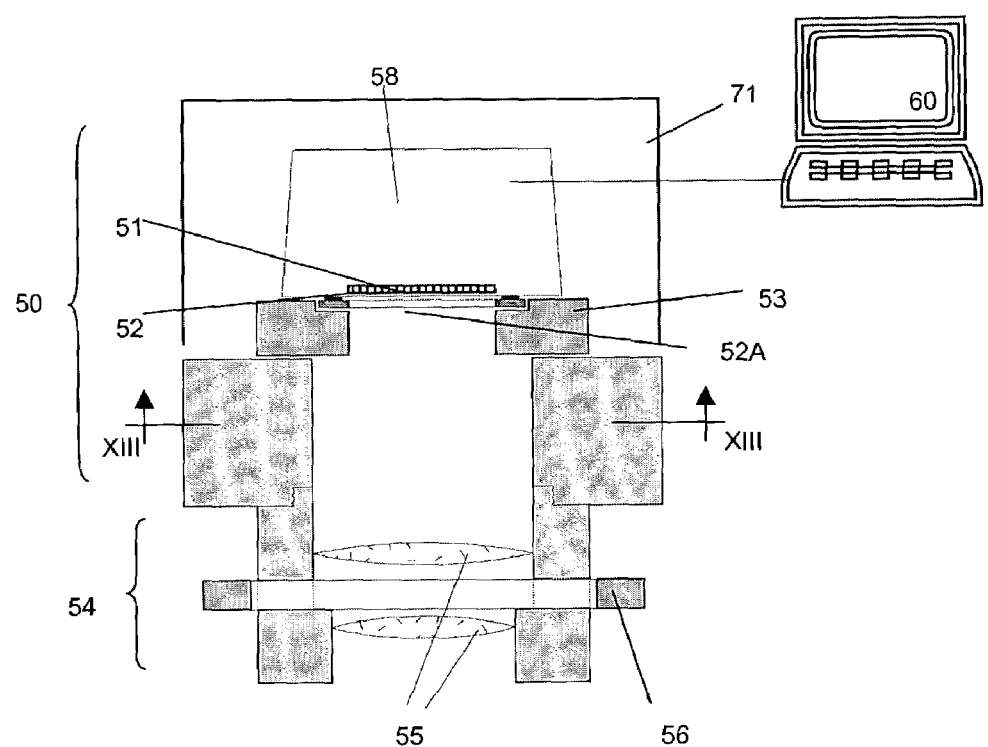
FIG. 12 is a cross section view of still another camera module.
Figure 13:
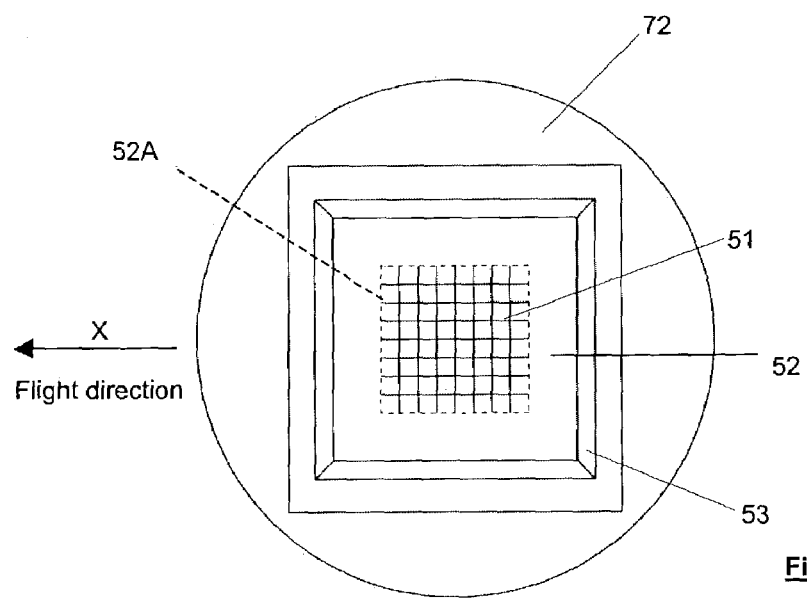
FIG. 13 is a cross section view along the line XIII-XIII of the camera module of FIG. 12.

FIGS. 12 and 13 show still another camera module similar to the camera module of FIG. 8. In this embodiment, the plate 52 of the flexure piezo positioner 53 has a central opening 52A. The framing sensor 51 is placed above said opening, while the electronic part 58 is directly attached to the plate 52. The framing sensor 51 is directly connected to its electronic part 58. According to another embodiment, the framing sensor is placed at least partly in said opening 52A, while still according to another possible embodiment, a part of the electronic part 58 extends through the opening 52A, while the framing sensor is located below the plate 52 towards the glasses 55. A cover 71 (attached to the rigid support 72) can be used for protecting the electronic part 58 of the framing sensor 51.

Figure 15:
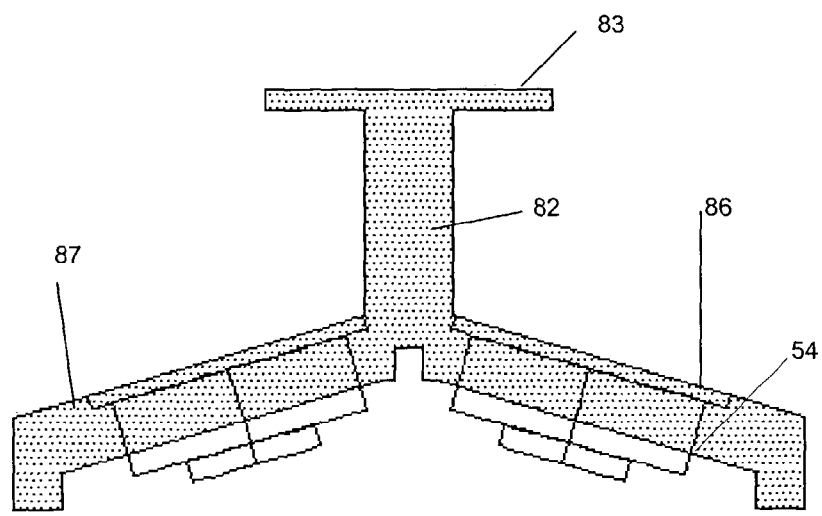
FIG. 15 is a cross section view of another support for camera modules.

FIG. 15 is a view of another support 8 which is provided with the portion 54 (comprising the lenses and the shutter). The portion of the camera module 50 with the framing sensor is mounted detachable with respect to the support 8. When having to take views at a different height, during a flight, it is possible to remove the support 8 with the camera modules 4 out of the receptacle 3, to remove the first portions 50 of the camera modules, to place said first portions 50 on another support 8 provided with portions 54 with different lenses, and then to place the support 8 with the camera modules in the receptacle 3. The first portion of the camera modules can for example be clipped on the fixation means 57. The support 8 can be provided with bottom protection covers for the lenses, said protection covers being provided with detachable glasses or with fixed glasses.

Figure 4:
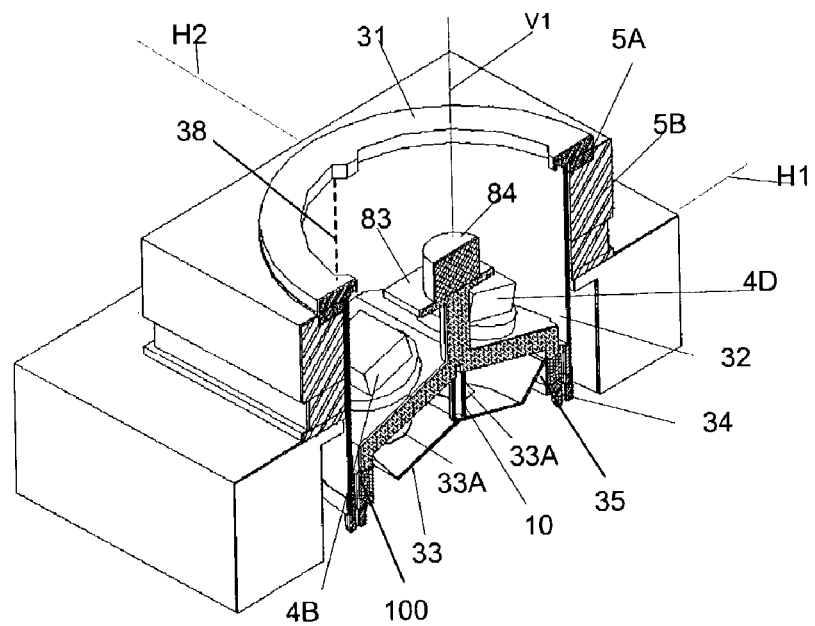
FIG. 4 is a partial perspective view of the device of FIG. 3.

In the embodiment of FIGS. 3 and 4, a support provided with bottom protection covers 33 and with detachable glasses 33A is shown. The glasses 33A are mounted detachably on the bottom protection covers 33 so as to close openings. The glasses 33A can be maintained in position by various mechanisms, such as clips, screws, etc. After removing the support 8 from the receptacle, it is possible to remove the glasses 33A from the bottom protection covers 33 of the removed support 8 and to place said glasses on the bottom protection covers of another support 8.

When using a support 8 with four camera modules 4 (see FIG. 5), the camera modules 4A and 4C take views of the ground at a time "T1", while the camera modules take views at a time "T2" different from time "T1", whereby enabling a transfer of data of the camera modules to a data treatment system during the taking of images by the camera modules 4B and 4D.

The camera modules represented as example in FIGS. 8 to 11 can be used in camera comprising only one camera module. The piezo flexure positioner can also be used in improving existing cameras by moving in a very precise way the framing sensor during the exposure time or at least during a portion of said exposure time.

What I claim is:

1. Device for cameras for taking images of an object or surface, said device being adapted to be mounted on a stabilized suspension system to be mounted on an movable vehicle moving in a movement direction at a relative speed higher than 100 km/hour with respect to the object or surface to be taken in images, said device comprising:

a frame, at least two camera modules for taking a first series of views by the first camera module and a second series of views by the second camera module, each camera module comprising a first camera portion comprising a framing sensor and a second camera portion comprising at least one lens, whereby each camera module has a central optical axis, said framing sensor being provided with means for transferring data collected by the sensor to an element selected from the group consisting of data memory, data treatment system and combinations thereof, and means adapted for orienting the central optical axis of each camera module with respect to the frame, in which the framing sensor of the first camera module adapted for taking a field of view during an exposure time of less than 0.1 second is associated to a forward motion compensation means comprising at least one piezo flexure positioner controlling a movement of the framing sensor at a substantially constant speed for a period greater than the exposure time of the framing sensor of the first camera module, in which the framing sensor of the second camera module adapted for taking a field of view during an exposure time of less than 0.1 second is associated to a forward motion compensation means comprising at least one piezo flexure positioner controlling a movement of the framing sensor at a substantially constant speed for a period greater than the exposure time, and in which the means for orienting the central optical axis of each camera module is adapted for orienting at least the central optical axis of a first camera module and the central optical axis of a second camera module, so that the first camera module and the second camera module have overlapping field of views, whereby said orienting means is mounted detachable with respect to the frame, while at least the first portion of the camera modules is mounted detachable with respect to said orienting means.

2. The device of claim 1, which comprises at least one means for positioning the means for orienting the central optical axes of the camera modules with respect to the frame.

3. The device of claim 1, in which the means for orienting the central optical axes of the camera modules is a rigid support provided with at least two passages, each passage being associated to at least one seat element adapted for contacting at least a portion of a camera module.

4. The device of claim 3, in which the rigid support is provided with an arm bearing an inertial module.

5. The device of claim 1, in which the orienting means is a support provided with at least two passages, each passage being associated to at least one seat element adapted for contacting a portion of a camera module, whereby a first seat is adapted for directing the central optical axis of a first camera module in a first direction, while a second seat is adapted for directing the central optical axis of a second camera module in a second direction, whereby the first and second directions are adapted for ensuring an overlapping of the field of view of the first camera module and the field of view of the second camera module.

6. The device of claim 1, in which the second portion of a camera module is mounted on the first portion of said camera module in a detachable way and in which at least one attachment means is adapted for maintaining the second portion in position with respect to the first portion of the camera module.

7. The device of claim 1, in which the second portion of the camera module is attached to the means for orienting the central optical axes of the camera modules.

8. The device of claim 1, in which the framing sensor of the camera module selected from the group consisting of the first camera module and the second camera module is associated to a forward motion compensation means comprising at least one piezo flexure positioner controlling a movement of the framing sensor at a substantially constant speed for a period of time greater than twice the exposure time of the framing sensor.

9. The device of claim 1, in which the framing sensor of the camera module selected from the group consisting of the first camera module and the second camera module is associated to a forward motion compensation means comprising at least one piezo flexure positioner controlling a movement of the framing sensor at a substantially constant speed for a period of time greater than five times the exposure time of the framing sensor.

10. The device of claim 1, in which the framing sensor of the camera module selected from the group consisting of the first camera module and the second camera module is mounted movable with respect to the second portion of the camera module along guiding rails.

11. The device of claim 1, in which the means for orienting the central optical axes of the camera modules is connected to the frame with interposition of a vibration absorbing means.

12. The device of claim 1, in which the orienting means is a support provided with at least four passages, each opening being associated to at least one seat element adapted for receiving a portion of a camera module, whereby a first seat is adapted for directing the central optical axis of a first camera module in a first direction, a second seat is adapted for directing the central optical axis of a second camera module in a second direction, a third seat is adapted for directing the central optical axis of a third camera module in a third direction and a fourth seat is adapted for directing the central optical axis of a fourth camera module, whereby the first and second directions are adapted for ensuring an overlapping of the field of view of the first camera module and the field of view of the second camera module, while the third and fourth directions are adapted for ensuring an overlapping of the field of view of the third camera module and the field of view of the fourth camera module.

13. The device of claim 1, in which the first and second camera modules are selected from the group consisting of IR camera modules, multi spectral camera modules, mono colour camera modules, panchromatic camera modules, and combinations thereof.

14. The device of claim 1, in which the frame is a receptacle provided with at least two passages, a first passage being adapted for placing the means for directing the central optical axis of the camera modules at least partly in the receptacle, while the second passage is adapted for ensuring the fields of view of the camera modules, and in which the receptacle is provided with means for supporting the means for directing the central optical axes of the camera modules with interposition of a vibration absorption means.

15. The device of claim 14, in which the receptacle is provided with a cover and a bottom element provided with transparent sheets, whereby defining a chamber in which the camera modules are located.

16. The device of claim 1, in which the frame is a receptacle provided with at least two passages, a first passage being adapted for placing the means for directing the central optical axes of the camera modules at least partly in the receptacle, while the second passage is adapted for ensuring the field of view of the camera modules, in which the receptacle is provided with means for supporting the means for directing the central optical axes of the camera modules with interposition of a vibration absorption means, and in which the receptacle is provided with means for connecting the receptacle on a stabilized suspension.

17. The device of claim 1, in which the frame is a receptacle provided with at least two passages, a first passage being adapted for placing the means for directing the central optical axes of the camera modules at least partly in the receptacle, while the second passage is adapted for ensuring the field of view of the camera modules, in which the receptacle is provided with means for supporting the means for directing the central optical axes of the camera modules with interposition of a vibration absorption means, in which the receptacle is provided with a cover and a bottom element with transparent sheets for defining a substantially closed chamber in which the camera modules are located, and in which the device comprises a heating element for ensuring a substantially constant temperature in the receptacle.

18. The device of claim 1, which comprises a stabilized suspension on which is connected the frame.

19. The device of claim 1, in which the framing sensor of the first camera module adapted for taking a field of view during an exposure time of less than 0.1 second is associated to a forward motion compensation means comprising at least one piezo flexure positioner controlling a movement of the framing sensor of less than 100 μm at a substantially constant speed for a period greater than the exposure time of the framing sensor of the first camera module, and in which the framing sensor of the second camera module adapted for taking a field of view during an exposure time of less than 0.1 second is associated to a forward compensation means comprising at least one piezo flexure positioner controlling a movement of the framing sensor of less than 100 μm at a substantially constant speed for a period greater than the exposure time of the framing sensor of the second camera module.

20. The device of claim 1, in which the second portion of said at least two camera modules comprises at least two lenses and a shutter located between said two lenses.

21. A camera module comprising a first portion with at least a framing sensor and a second portion comprising at least one lens, whereby the camera module has a central optical axis, said framing sensor being provided with means for transferring data collected by the sensor to an element selected from the group consisting of data memory, data treatment system and combinations thereof whereby the camera module is adapted for taking a view in a exposure time of less than 0.1 second, in which the framing sensor of the camera module is mounted movable with respect to the second portion, and in which the framing sensor adapted for taking a field of view during an exposure time of less than 0.1 second is associated at least to a piezo flexure positioner ensuring at least a movement of the framing sensor at a substantially constant speed for a period of time greater than the exposure time.

22. The module of claim 21, in which the framing sensor adapted for taking a field of view during an exposure time of less than 0.1 second is associated at least to a piezo flexure positioner ensuring at least a movement of the framing sensor at a substantially constant speed for a period of time greater than 5 times the exposure time.

23. The module of claim 21, in which the framing sensor is movable along guiding rails.

24. The module of claim 21, which is selected from the group consisting of IR camera modules, multi spectral camera modules, mono colour camera modules, panchromatic camera modules, and combinations thereof.

25. The module of claim 21, in which the second portion of the camera module comprises at least two lenses and a shutter located between said two lenses.

26. A flying apparatus provided with cameras for taking images of an object or surface, said apparatus being adapted to move in a forward motion direction at a relative speed higher than 100 km/hour with respect to the object or surface to be taken in images, said flying apparatus comprising a stabilized suspension on which a device with distinct camera modules is mounted, said device comprising:

a frame, at least two camera modules for taking a first series of views by the first camera module and a second series of views by the second camera module, each camera module comprising a first camera portion comprising a framing sensor and a second camera portion comprising at least one lens, whereby each camera module has a central optical axis, said framing sensor being provided with means for transferring data collected by the sensor to an element selected from the group consisting of data memory, data treatment system and combinations thereof, and means adapted for orienting the central optical axis of each camera module with respect to the frame, in which the framing sensor of the first camera module adapted for taking a field of view during an exposure time of less than 0.1 second is associated to a forward motion compensation means comprising at least one piezo flexure positioner controlling a movement of the framing sensor at a substantially constant speed for a period greater than the exposure time of the framing sensor of the first camera module, in which the framing sensor of the second camera module adapted for taking a field of view during an exposure time of less than 0.1 second is associated to a forward motion compensation means comprising at least one piezo flexure positioner controlling a movement of the framing sensor at a substantially constant speed for a period greater than the exposure time, and in which the means for orienting the central optical axis of each camera module is adapted for orienting at least the central optical axis of a first camera module and the central optical axis of a second camera module, so that the first camera module and the second camera module have overlapping field of views, whereby said orienting means is mounted detachable with respect to the frame, while at least the first portion of the camera modules is mounted detachable with respect to said orienting means.

27. The apparatus of claim 26, in which the device comprises at least one means for positioning the means for orienting the central optical axes of the camera modules with respect to the frame.

28. The apparatus of claim 26, in which the means for orienting the central optical axes of the camera modules is a rigid support provided with at least two passages, each passage being associated to at least one seat element adapted for contacting at least a portion of a camera module.

29. The apparatus of claim 26, in which the rigid support is provided with an arm on which is attached an inertial module.

30. The apparatus of claim 26, in which the orienting means is a support provided with at least two passages, each passage being associated to at least one seat element adapted for contacting a portion of a camera module, whereby a first seat is adapted for directing the central optical axis of a first camera module in a first direction, while a second seat is adapted for directing the central optical axis of a second camera module in a second direction, whereby the first and second directions are adapted for ensuring an overlapping of the field of view of the first camera module and the field of view of the second camera module.

31. The apparatus of claim 26, in which the second portion of a camera module is mounted on the first portion of said camera module in a detachable way and in which at least one attachment means is adapted for maintaining the second portion in position with respect to the first portion of the camera module.

32. The apparatus of claim 26, in which the second portion of the camera module is attached to the means for orienting the central optical axes of the camera modules.

33. The apparatus of claim 26, in which the camera module selected from the group consisting of the first camera module and the second camera module is adapted for taking a field of view in a exposure time of less than 0.1 second, in which the framing sensor of the camera module selected from the group consisting of the first camera module and the second camera module is mounted movable with respect to the second portion of the camera module considered, and in which the framing sensor of the camera module selected from the group consisting of the first camera module and the second camera module is associated to a forward motion compensation means comprising at least one piezo flexure positioner ensuring at least a movement of the framing sensor at a substantially constant speed for a period of time greater than twice the exposure time of the framing sensor.

34. The apparatus of claim 26, in which the camera module selected from the group consisting of the first camera module and the second camera module is adapted for taking a field of view in a exposure time of less than 0.1 second, in which the framing sensor of a camera module is mounted movable with respect to the second portion of the camera module considered, and in which the framing sensor of the camera module selected from the group consisting of the first camera module and the second camera module is associated to a forward motion compensation means comprising at least one piezo flexure positioner ensuring at least a movement of the framing sensor at a substantially constant speed for a period of time greater than 5 times the exposure time of the framing sensor.

35. The apparatus of claim 26, in which the framing sensor of the camera module selected from the group consisting of the first camera module and the second camera module is mounted movable with respect to the second portion of the camera module along guiding rails.

36. The apparatus of claim 26, in which the means for orienting the central optical axis of the camera modules is connected to the frame with interposition of a vibration absorbing means.

37. The apparatus of claim 26, in which the orienting means is a support provided with at least four passages, each opening being associated to at least one seat element adapted for receiving a portion of a camera module, whereby a first seat is adapted for directing the central optical axis of a first camera module in a first direction, a second seat is adapted for directing the central optical axis of a second camera module in a second direction, a third seat is adapted for directing the central optical axis of a third camera module in a third direction and a fourth seat is adapted for directing the central optical axis of a fourth camera module, whereby the first and second directions are adapted for ensuring an overlapping of the field of view of the first camera module and the field of view of the second camera module, while the third and fourth directions are adapted for ensuring an overlapping of the field of view of the third camera module and the field of view of the fourth camera module.

38. The apparatus of claim 26, in which the camera module is selected from the group consisting of IR camera module, multi spectral camera module, mono colour camera module, panchromatic camera module, and combinations thereof.

39. The apparatus of claim 26, in which the frame is a receptacle provided with at least two passages, a first passage being adapted for placing the means for directing the central optical axis of the camera modules at least partly in the receptacle, while the second passage is adapted for ensuring the fields of view of the camera modules, and in which the receptacle is provided with means for supporting the means for directing the central optical axes of the camera modules with interposition of a vibration absorption means.

40. The apparatus of claim 39, in which the receptacle is provided with a cover and a bottom element provided with transparent sheets, whereby defining a chamber in which the camera modules are located.

41. The apparatus of claim 26, in which the frame is a receptacle provided with at least two passages, a first passage being adapted for placing the means for directing the central optical axes of the camera modules at least partly in the receptacle, while the second passage is adapted for ensuring the field of view of the camera modules, in which the receptacle is provided with means for supporting the means for directing the central optical axes of the camera modules with interposition of a vibration absorption means, and in which the receptacle is provided with means for connecting the receptacle on a stabilized suspension.

42. The apparatus of claim 26, in which the frame is a receptacle provided with at least two passages, a first passage being adapted for placing the means for directing the central optical axes of the camera modules at least partly in the receptacle, while the second passage is adapted for ensuring the field of view of the camera modules, in which the receptacle is provided with means for supporting the means for directing the central optical axes of the camera modules with interposition of a vibration absorption means, in which the receptacle is provided with a cover and a bottom element with transparent sheets for defining a substantially closed chamber in which the camera modules are located, and in which the device comprises a heating element for ensuring a substantially constant temperature in the receptacle.

43. The apparatus of claim 26, in which the framing sensor of the first camera module adapted for taking a field of view during an exposure time of less than 0.1 second is associated to a forward motion compensation means comprising at least one piezo flexure positioner controlling a movement of the framing sensor of less than 100 μm at a substantially constant speed for a period greater than the exposure time of the framing sensor of the first camera module, and in which the framing sensor of the second camera module adapted for taking a field of view during an exposure time of less than 0.1 second is associated to a forward compensation means comprising at least one piezo flexure positioner controlling a movement of the framing sensor of less than 100 μm at a substantially constant speed for a period greater than the exposure time of the framing sensor of the second camera module.

44. The flying apparatus of claim 26, in which the second portion of said at least two camera modules comprises at least two lenses and a shutter located between said two lenses.

45. A flying apparatus provided with cameras for taking images of an object or surface, said apparatus being adapted to move in a movement direction at a relative speed higher than 100 km/hour with respect to the object or surface to be taken in images, said flying apparatus comprising a stabilized suspension on which a device with at least one camera module is mounted, whereby at least one camera module comprises a first portion with a framing sensor and a second portion with at least one lens, whereby the camera module has a central optical axis, said framing sensor being provided with means for transferring data collected by the sensor to an element selected from the group consisting of data memory, data treatment system and combinations thereof, whereby the camera module is adapted for taking a view in a exposure time of less than 0.1 second, in which the framing sensor of the camera module is mounted movable with respect to the second portion, and in which the framing sensor is associated to a forward motion compensation means comprising at least one piezo flexure positioner ensuring a movement of the framing sensor at a substantially constant speed for a period of time greater than the exposure time.

46. The apparatus of claim 45, in which the framing sensor is associated to forward motion compensation means comprising at least one piezo flexure positioner ensuring a movement of the framing sensor at a substantially constant speed for a period of time greater than twice the exposure time.

47. The apparatus of claim 45, in which the framing sensor is associated to piezo flexure positioner ensuring a movement of the framing sensor at a substantially constant speed for a period of time greater than five times the exposure time, with respect to the second portion of the camera module in a direction opposite to the movement direction of the flying apparatus.

48. The apparatus of claim 45, in which the framing sensor is movable along guiding rails.

49. The apparatus of claim 45, in which the camera module is selected from the group consisting of IR camera modules, multi spectral camera modules, mono colour camera modules, panchromatic camera modules, and combinations thereof.

50. The apparatus of claim 45, in which the camera module comprises a supporting piece bearing the framing sensor, as well as electronic control means for said framing sensor, said supporting piece having a first edge and a second edge opposite to the first edge, whereby the module comprises two piezo flexure positioners having each a moving part, the moving part of a first piezo flexure positioner being attached to the first edge of the supporting piece, while the moving part of the second piezo flexure positioner is attached to the second edge of the supporting piece.

51. The apparatus of claim 45, in which the device mounted on the stabilized suspension is provided with several distinct camera modules.

52. The apparatus of claim 45, in which the framing sensor of the first camera module adapted for taking a field of view during an exposure time of less than 0.1 second is associated to a forward motion compensation means comprising at least one piezo flexure positioner controlling a movement of the framing sensor of less than 100 µm at a substantially constant speed for a period greater than the exposure time of the framing sensor of the first camera module, and in which the framing sensor of the second camera module adapted for taking a field of view during an exposure time of less than 0.1 second is associated to a forward compensation means comprising at least one piezo flexure positioner controlling a movement of the framing sensor of less than 100 µm at a substantially constant speed for a period greater than the exposure time of the framing sensor of the second camera module.

53. The flying apparatus of claim 45, in which the second portion of said at least one camera module comprises at least two lenses and a shutter located between said two lenses.

54. A process for taking images of an object or surface from a flying apparatus moving in a forward motion direction at a relative speed higher than 100 km/hour with respect to the object or surface to be taken in images, in which the flying apparatus is provided with a stabilized suspension system on which a device with distinct camera modules is mounted, said device comprising:

a frame, at least two camera modules for taking a first series of views by the first camera module and a second series of views by the second camera module, each camera module comprising a first camera portion comprising a framing sensor and a second camera portion comprising at least one lens, whereby each camera module has a central optical axis, said framing sensor being provided with means for transferring data collected by the sensor to an element selected from the group consisting of data memory, data treatment system and combinations thereof, and means adapted for orienting the central optical axis of each camera module with respect to the frame, whereby the framing sensor of the first camera module adapted for taking a series of field of view, each field of view being taken during an exposure time of less than 0.1 second, the framing sensor being associated to a forward motion compensation means comprising at least one piezo flexure positioner controlling a movement of the framing sensor at a substantially constant speed for a period greater than the exposure time of the framing sensor of the first camera module, so as to ensure a forward motion compensation for the views taken by the framing sensor, whereby the framing sensor of the second camera module adapted for taking a series of field of view, each field of view being taken during an exposure time of less than 0.1 second, the framing sensor being associated to a forward motion compensation means comprising at least one piezo flexure positioner controlling a movement of the framing sensor at a substantially constant speed for a period greater than the exposure time of the framing sensor of the first camera module, so as to ensure a forward motion compensation for the views taken by the framing sensor, and in which the means for orienting the central optical axis of each camera module is adapted for orienting at least the central optical axis of the first camera module and the central optical axis of the second camera module, so that the first camera module and the second camera module have overlapping field of views between the fields of view taken by the framing sensor of the first camera module and the fields of view taken by the framing sensor of the second camera module.

55. The process of claim 54, in which the second portion of said at least two camera modules comprises at least two lenses and a shutter located between said two lenses.

* * * * *